United States Patent [19]
Marsh

[11] 3,861,894
[45] Jan. 21, 1975

[54] PORTABLE CLEAN-AIR GENERATOR

[75] Inventor: Robert Claude Marsh, Albuquerque, N. Mex.

[73] Assignee: Bio-Dynamics, Inc., Castleton, Ind.

[22] Filed: Oct. 13, 1972

[21] Appl. No.: 297,332

[52] U.S. Cl..................... 55/316, 21/74 R, 55/233, 55/357, 55/473, 55/493, 55/502, 55/DIG. 29, 190/41 R, 417/411
[51] Int. Cl............................................ B01d 50/00
[58] Field of Search............ 55/233, 279, 316, 467, 55/357, 473, 493, DIG. 29, 482, 502; 21/74 R; 190/17, 51, 41 R; 417/411

[56] References Cited
UNITED STATES PATENTS

| | | | |
|---|---|---|---|
| 2,310,118 | 2/1943 | Reinhardt | 21/74 |
| 3,094,400 | 6/1963 | Blanton | 55/279 |
| 3,417,549 | 12/1968 | Leosis | 55/493 |
| 3,523,409 | 8/1970 | Paterson | 55/471 |
| 3,672,126 | 6/1972 | Goettle | 55/233 |
| 3,721,067 | 3/1973 | Agnew | 55/DIG. 29 |
| 3,757,495 | 9/1973 | Sievers | 55/279 |

FOREIGN PATENTS OR APPLICATIONS

| | | | |
|---|---|---|---|
| 909,924 | 11/1962 | Great Britain | 55/DIG. 29 |

*Primary Examiner*—Bernard Nozick
*Attorney, Agent, or Firm*—Woodard, Weikart, Emhardt & Naughton

[57] ABSTRACT

A hinged case is divided into an intake chamber and an exhaust chamber, said chambers being connected by a centrifugal blower. An intake opening is formed in the case communicating the atmosphere with the intake chamber through a filter disposed within said opening. An exhaust opening is formed within said case communicating the exhaust chamber with the atmosphere. A humidifier is disposed within said second opening for humidifying the exhaust air. A filter assembly, including a peripheral frame, is mounted within said case so that one edge of said frame is in sealing engagement with the case about the exhaust opening. An odor filter and a high efficiency particle filter are mounted within said frame for properly treating and filtering the exhaust air. The case is shaped so that either a horizontally or downwardly directed laminar flow of air is provided.

11 Claims, 4 Drawing Figures

PORTABLE CLEAN-AIR GENERATOR

BACKGROUND OF THE INVENTION

1. Field of the Invention

The present invention relates to air filters and more particularly to a portable device for treating and filtering air so as to provide a zone of clean air.

2. Description of the Prior Art

Heretofore, most prior art air treatment devices were complex installations usually associated with heating or air conditioning systems permanently installed in buildings. Most of these devices provided particulate filters for removing dust and humidifiers for humidification of the air. However, because of the structural requirements of these devices, the filtering and humidification were accomplished at a central location and at a point of high air velocity. Because of the high velocity, efficient filtering was not achieved and as a result, many asthmatics continued to suffer from air borne allergens.

For use in buildings and areas that do not have air treatment devices, portable devices were developed for filtering air in the vicinity of the device. Such a device is described in U.S. Pat. No. 3,523,409, issued to W. A. Paterson, entitled "Portable Air Filter." The Paterson device provided conventional filters that could be chemically treated to remove bacteria or germs and a centrifugal blower for drawing air through the filters. The Paterson device did not provide a laminar flow of air so as to create a zone of substantially clean air nor did the device provide for the complete treatment and purification of the air.

SUMMARY OF THE INVENTION

The present invention contemplates a portable clean-air generator that may be used by asthmatics to provide a zone of pure air in an otherwise contaminated atmosphere. The device provides a laminar air flow and may be positioned to provide this flow in either a horizontal or downward direction, whichever is the most convenient and comfortable for the user.

The clean-air generator includes a hinged luggage-type case divided into intake and exhaust chambers. A centrifugal blower connects the two chambers and draws air into the intake chamber through an air intake opening which is covered by a conventional intake filter for removing the larger particulate matter. The blower directs the air into the exhaust chamber where the air is exhausted through a filter assembly including an odor filter and a high efficiency particle filter after which the filtered air passes through a humidifier assembly mounted in an outlet opening in the case.

The filter assembly includes a frame which functions as a duct to establish the laminar air flow. The filter frame has an outwardly extending flange formed around the entire periphery of the filter. The outwardly extending flange is formed of a deformable material and is sandwiched within a channel formed when the hinged case is closed.

The intake filter removes the larger particulate matter while the high efficiency particle filter removes particles as small as 0.3 microns with an efficiency of 99 per cent. The odor filter removes offensive odors while the humidifier properly conditions the air for breathing comfort.

The primary objective of the present invention is to provide a portable clean-air generator for providing a zone of purified air.

Another objective of the present invention is to provide a portable air filtering device having high efficiency in the range of 99 per cent.

Another objective of the present invention is to provide a portable high efficiency air filter that provides a laminar flow of filtered air so as to create a zone of clean air.

Another objective of the present invention is to provide a portable clean-air generator that both filters and treats the air to provide substantially pure air.

Another objective of the present invention is to provide a portable clean-air generator that may be operated in one of two positions to provide either a horizontal or downward laminar flow of air.

The foregoing objectives and advantages of the invention will appear more fully hereinafter from a consideration of the detailed description which follows, taken together with the accompanying drawings, wherein one embodiment of the invention is illustrated by way of example. It is to be expressly understood, however, that the drawings are for illustrative purposes only and are not to be considered as defining the limits of the invention.

DESCRIPTION OF THE INVENTION

Figure 1:
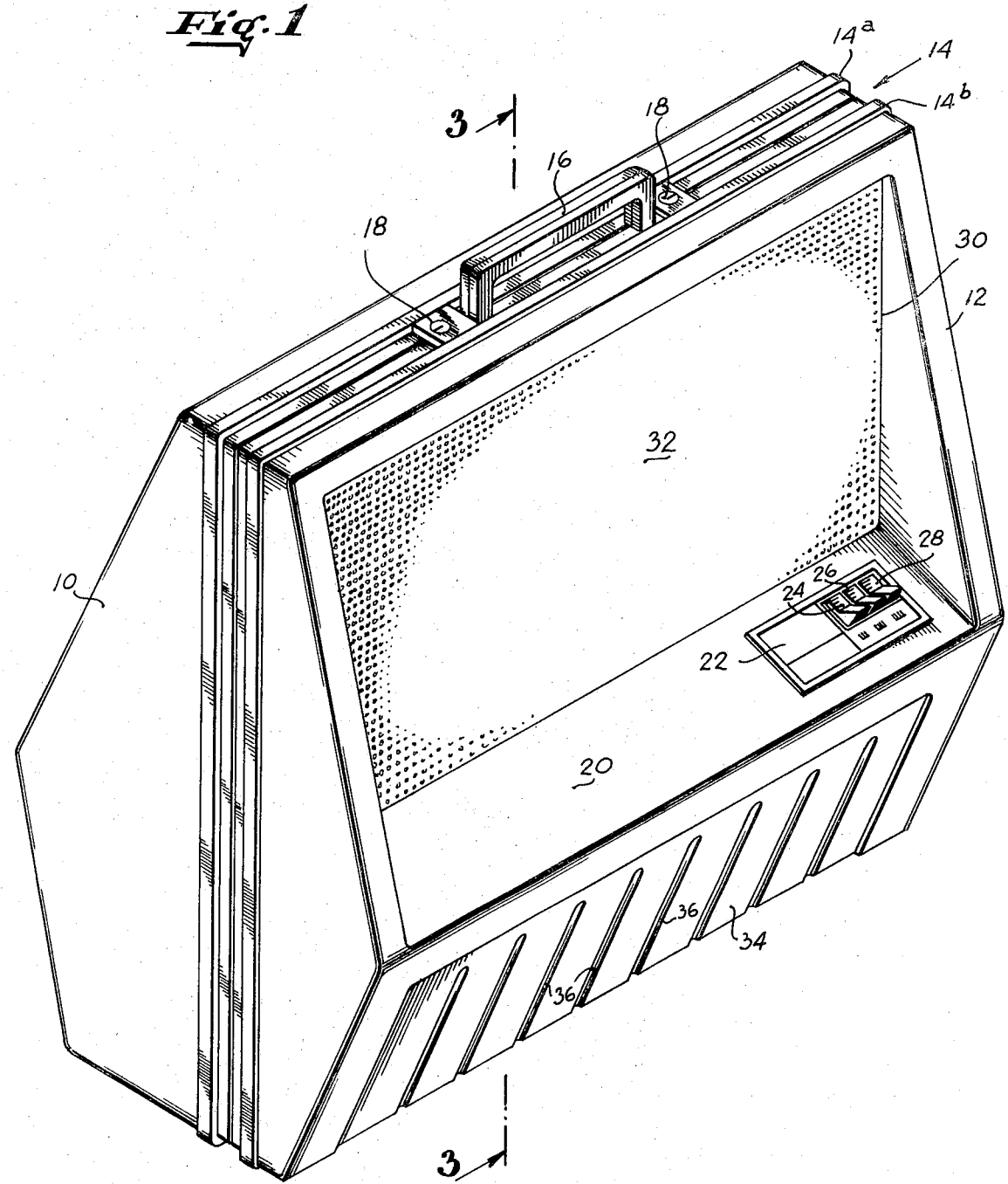
FIG. 1 is an isometric view of the clean-air generator of the present invention.

Referring to FIG. 1, there is shown an isometric view of the clean-air generator of the present invention. The generator has a hinged luggage-type case including a rear section 10 and a front section 12, each being formed of molded plastic or fiber glass. The front and rear sections are connected by a holding frame 14 extending completely around the periphery of the clean-air generator. The holding frame is similar to those used for molded luggage and is formed in two halves, one half 14a attached to the rear section 10 and the other half 14b attached to the front section 12, said halves being hingedly attached to each other along a bottom side of the frame. The frame 14 includes grooves 15 for receiving the sections 10 and 12 as most clearly shown in FIG. 3. Frame 14 includes a handle 16 and latch means 18 mounted thereto on a top side of the frame. The holding frame may be extruded, cast, die formed, molded or machined of various rigid materials.

The front section 12 includes a bezel 20 upon which is mounted a control panel 22 having an off-on switch 24, a high speed switch 26 and a low speed switch 28. The front section also has formed therein an outlet opening 30 over which is mounted a humidifier assembly 32 having a screen material on its front face. The front section also includes a slope panel 34 having ribs 36 formed therein for increased strength and rigidity.

Figure 2:
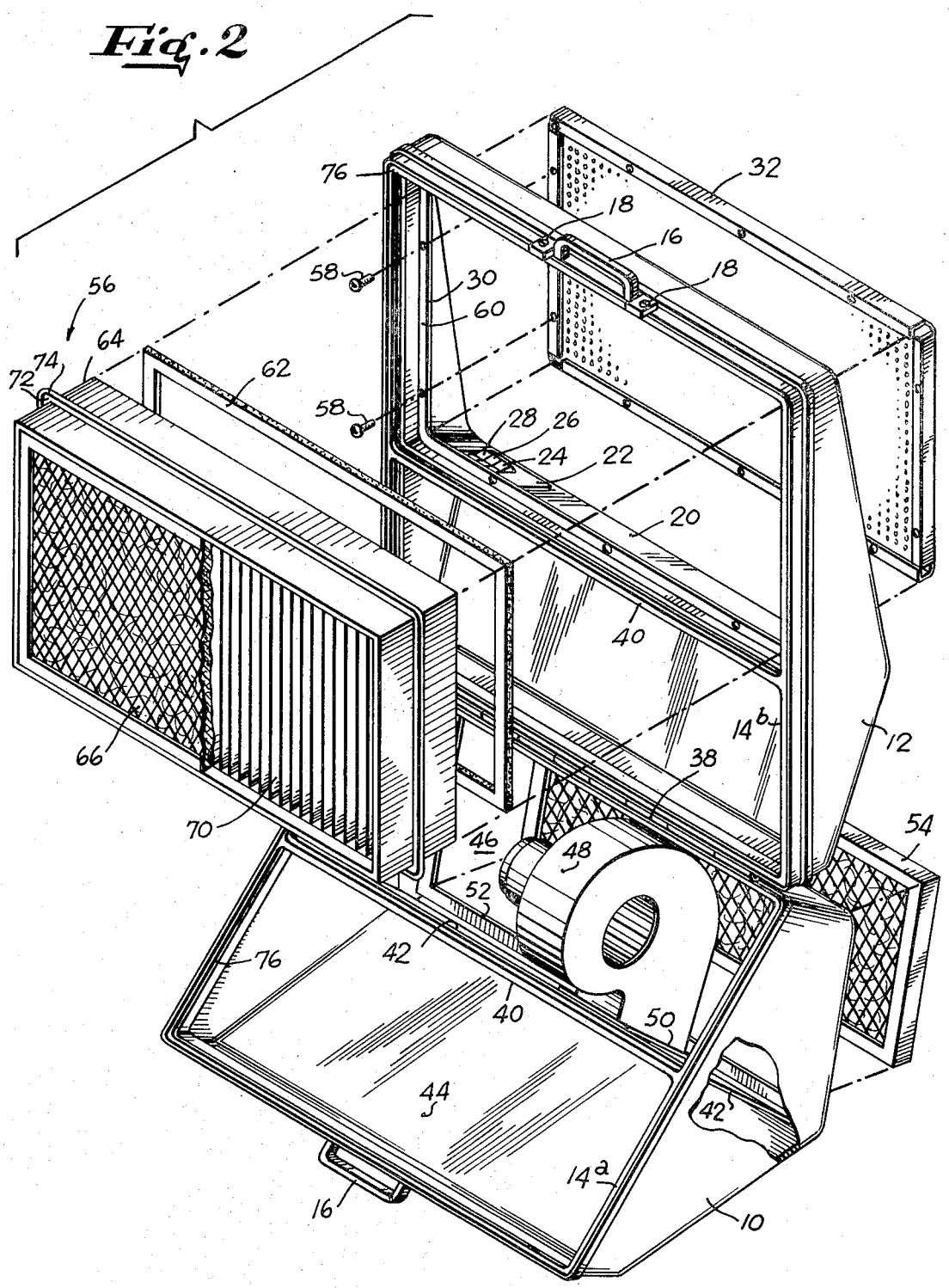
FIG. 2 is an exploded view showing the clean-air generator of the present invention with the case in the open position.

Referring to FIG. 2, there is shown the clean-air generator of the present invention in an exploded view with the case in the open position. Rear section 10 and front section 12 of the case are connected to the respective halves of frame 14, the halves of the frame being hinged together by hinge means 38, which may be a piano type hinge or separate hinges. Each half of frame 14 includes a cross member 40, which divides the frame into upper and lower sections. A partition 42 is mounted to the cross member 40 of the rear half 14a of frame 14 and extends across the rear section 10 so as to divide the rear section into an exhaust chamber 44 and an intake chamber 46.

A centrifugal blower 48 is positioned in the intake chamber 46 and is mounted to partition 42 so that its exhaust outlet 50 is superposed with an opening formed in partition 42 communicating the blower exhaust outlet with exhaust chamber 44.

Rear section 10 has an intake opening 52 formed to communicate the intake chamber with the exterior of the clean-air generator. A conventional air filter 54 is removably attached to the rear section 10 so as to completely cover intake opening 52 and provide filtering of the intake air so as to remove the larger particles of dust from the intake air. Filter 54 may be attached by spring clips or other convenient attaching means, such as wing nuts or the like.

A filter assembly shown generally at 56 is mounted between exhaust chamber 44 and outlet opening 30 to provide both treatment and filtering of the exhaust air. Humidifier assembly 32 is mounted to front section 12 by screws 58 which extend through a flange 60 formed in front section 12 and thread into assembly 32. Humidifier assembly 32 completely covers opening 30 for humidifying the exhaust air after it passes through the filter assembly 56. A gasket 62 is disposed between filter assembly 56 and flange 60 to effect a seal therebetween.

Figure 3:
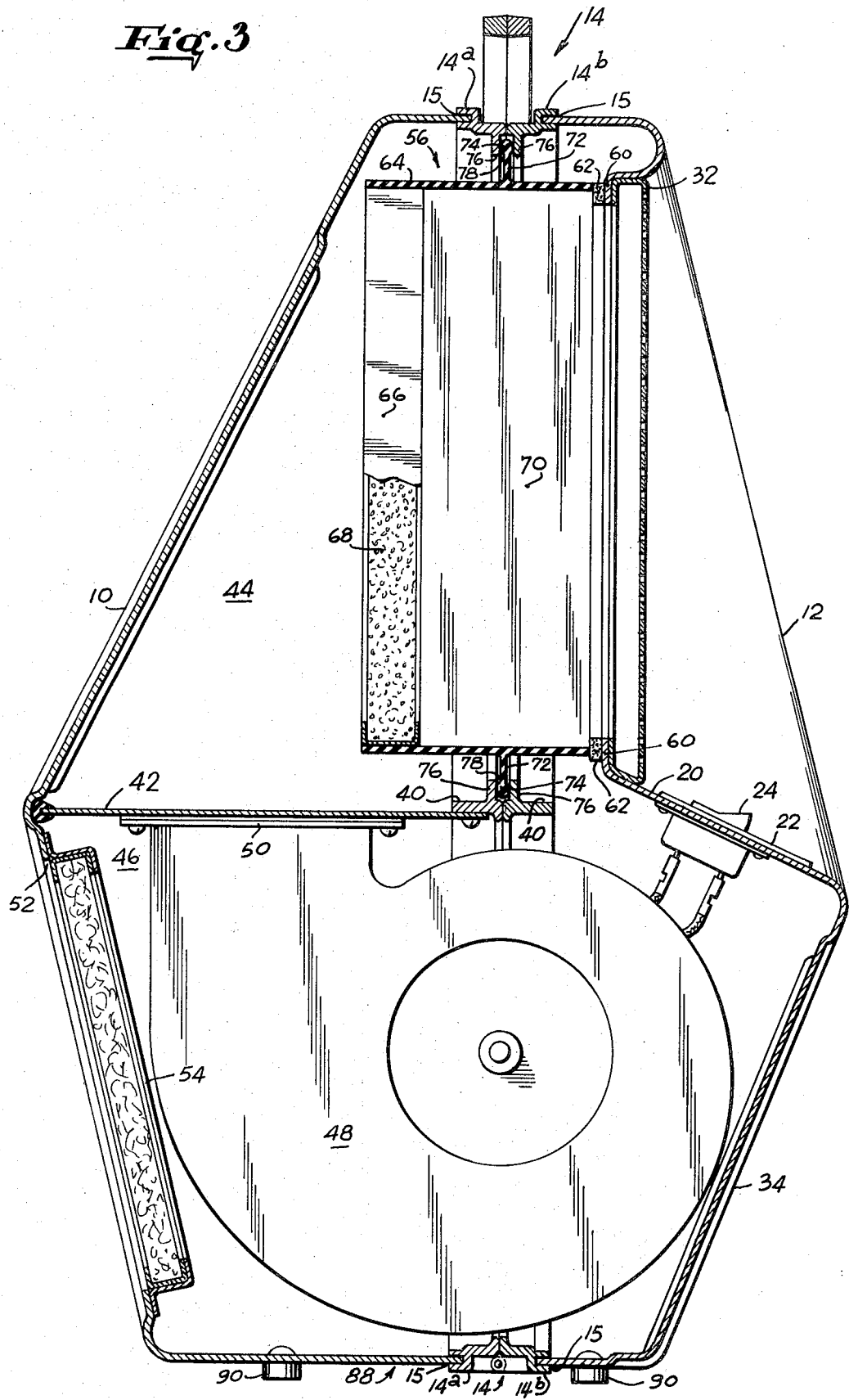
FIG. 3 is a sectional view taken along line 3—3 of FIG. 1.

Referring to FIG. 3, there is shown in greater detail how the filter assembly 56 is mounted in frame 14. The filter assembly includes a filter frame 64 extending entirely about the periphery of the filter assembly. The filter frame used herein is described in application Ser. No. 297,333, entitled "Filter Frame," filed on even date herewith and now abandoned. Within the frame 64, is mounted an odor filter 66 which contains absorbent filtering material 68, such as activated charcoal or silica gel for absorbing obnoxious odors and undesirable gases. A high efficiency particle filter 70 capable of removing particles having a size of 0.3 microns with an efficiency of 99 per cent is also mounted in frame 64. Examples of this type filter may be found in U.S. Pat. Nos. 3,277,638, 3,280,540 and 3,360,910.

Frame 64 includes an outwardly extending flange 72 disposed about the entire periphery of the frame. Said flange includes a continuous deformable bead 74 extending from each side of said flange and formed around the entire length of the flange.

Each half of frame 14 and cross member 40 includes an inwardly extending member 76 positioned so that when the frame is closed, a channel 78 is formed for receiving the deformable bead 74 on flange 72. The flange 72 and more particularly the bead 74 is formed of a deformable material which may be slightly deformed by pressure exerted by members 76 when the case is closed and the bead is sandwiched between members 76. It is to be noted that bead 74 is slightly flattened on each side by members 76. The deformation of bead 74 causes a seal to be effected between flange 72 and members 76 of frame 14. The deformable bead 74 may be formed in several configurations as described in the previously mentioned copending application; however, the most desired configuration is one that has the least area of contact between the bead and members 76. Such a configuration requires less pressure to deform the bead and effect a seal.

Figure 4:
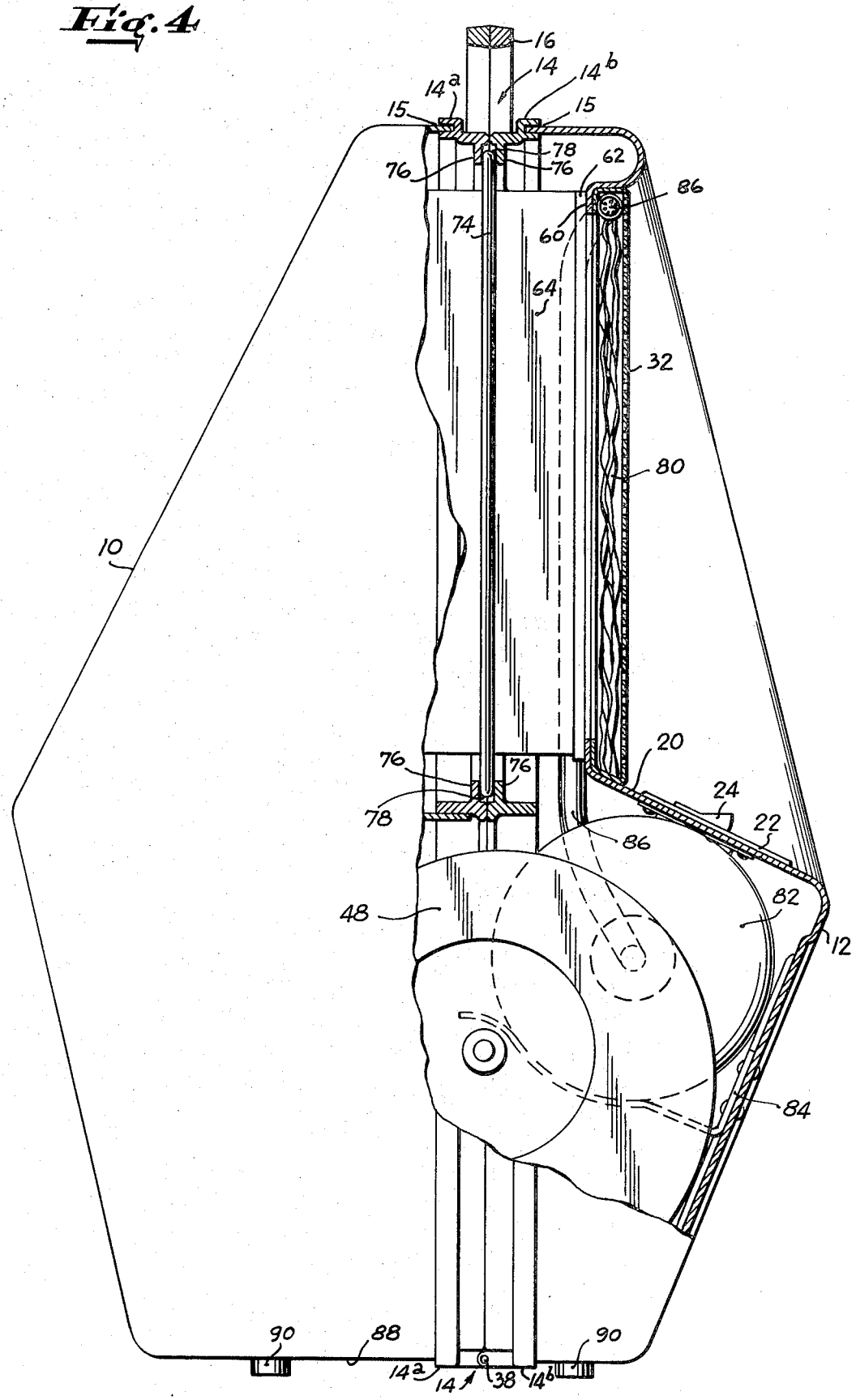
FIG. 4 is a cutaway view of a side elevation of the clean-air generator of the present invention.

Humidifier assembly 32, as previously mentioned, is attached to flange 60 so as to completely cover opening 30. Referring to FIG. 4, the humidifier includes water absorbent material 80, such as shredded absorbent paper or blotter pads preferably in the form of juxtaposed sheets suspended within the assembly so that the exhaust air must flow between the sheets. A polyethylene bottle 82 is mounted to front section 12 by a clip 84. A capillary tube 86 connects the bottle to the humidifier assembly 32 at a position above the sheets of absorbent material. In use, the bottle is filled with water which is fed to the absorbent material by the capillary action of the tube 86. The absorbent material absorbs the water from the tube 74 and remains in a moist condition to provide humidification of the exhaust air passing the material.

It is to be noted that frame 64 of the filter assembly 56 forms an air duct for directing exhaust air out of the clean-air generator and forming a laminar air flow for a distance of approximately 3 ½ feet. The laminar air flow creates a zone of clean air in which the user may work without experiencing the discomfort created by allergens contained in the untreated atmosphere.

The clean-air generator has a bottom 98 formed of portions of the rear and front sections, said bottom has feet 90 upon which the generator may stand. When the generator is standing upright on feet 90, a horizontal laminar air flow is provided so that a clean-air zone is formed in front of the generator. In such a position, the generator may be placed on a table adjacent the individual using the generator. The generator may also be positioned to stand on panel 34 to provide a downwardly directed laminar flow of clean air. In such a position, the generator may be placed on a shelf above the user or it may be mounted on the headboard of a bed to provide a zone of clean air while the user is sleeping.

The clean-air generator has a relatively low noise level; however, switches are provided for two-speed operation so that almost noiseless operation may be achieved when a person wishes to sleep or desires extremely quiet operation.

The filters used within the clean-air generator are easily removed for cleaning or replacement. The conventional filter 54 is easily snapped from the rear of the generator while the filter assembly 56 may be removed by opening the case and merely lifting the frame from one half of channel 78 formed by frame 14.

Thus, the present invention teaches a portable clean-air generator that provides a zone of clean air for the user. The device may be positioned for horizontal air flow or a downwardly directed flow of air whichever is most convenient for the user. The filter assembly is 99 per cent efficient so as to eliminate essentially all harmful dust and allergens. In addition to providing filtration of particulate matter, the generator also provides an odor filter and humidification of the exhaust air so that a zone of air is provided that has been filtered and treated. The clean-air generator is provided in a housing formed of molded plastic or fiber glass so as to have exceptional strength and lightweight which are essential features for a portable device.

What is claimed is:

1. A portable air filtering device, comprising:
   a portable case including first and second separable sections;
   a particle filter mounted in a frame extending about the entire periphery thereof, said frame including means for being sandwiched between the first and second sections when said case is closed;
   means on said first and second sections for effecting a seal between the frame and the first and second sections of the case when the case is closed;
   latch means for holding the first and second sections in a closed position; and
   circulation means for circulating unfiltered air through said case and said filter, whereby a flow of filtered air is exhausted from said case, the case including an inlet opening, coupled to the circulation means, and an outlet opening disposed along the path of the flow of air in the case on the opposite side of the filter from the inlet opening.

2. A portable clean-air generator as described in claim 1, additionally comprising an odor filter positioned so that air passing through the outlet opening passes through said odor filter for removal of obnoxious odors and gases.

3. A portable clean-air generator as described in claim 1, additionally comprising a humidifer positioned in the flow of filtered air for humidifying the filtered air.

4. A portable clean-air generator as described in claim 1, wherein the high efficiency filter is positioned adjacent the outlet opening and includes a frame in which said filter is mounted, said frame functioning to establish a laminar flow of filtered air.

5. A portable clean-air generator as described in claim 4, additionally comprising:
   an outwardly extending flange formed around the entire periphery of the filter frame;
   a continuous deformable portion formed on said flange; and
   means associated with said first and second sections of said portable case for engaging said deformable portion along its entire length when said case is closed and latched, whereby said deformable portion is deformed and forms a seal between said engaging means and said flange.

6. A portable air filtering device as described in claim 1, wherein the portable casing includes means for selectively positioning said casing in one of two positions to establish either a horizontal laminar flow or a downwardly directed laminar flow of filtered air.

7. A portable air filtering device as described in claim 6, wherein the means for selectively positioning the casing in either of two positions comprises:
   a bottom surface formed in said casing so that when said casing is standing on said bottom surface a horizontal laminar flow of filtered air is provided; and
   a sloped front panel on which said casing may stand to provide a downwardly directed laminar flow of filtered air.

8. A portable air filtering device as described in claim 1, wherein the means for being sandwiched comprises:
   an outwardly extending flange formed about the entire periphery of the frame;
   a continuous deformable portion being disposed between said flange and said first and second sections so that said portion is deformed to effect a seal between said flange and said first and second sections when said case is closed.

9. A portable air filtering device as described in claim 8, wherein the continuous deformable portion is associated with said flange and the first and second sections each comprise a continuous inwardly directed member formed about the edge of each section, said members being spaced from said edge to form a continuous channel when the case is closed, said deformable portion being disposed within said channel in sealing engagement therewith.

10. A portable clean-air generator adapted to receive a high efficiency filter of the type that is mounted in a frame extending around the entire periphery of the filter and has a continuous outwardly extending flange around said frame and a continuous deformable portion formed on said flange, said generator comprising:
    a portable case including first and second separable sections;
    means on said first and second sections for engaging and sandwiching said deformable portion about its entire length when the case is closed, whereby a seal is effected between the flange and the engaging means;
    latch means for holding the first and second sections in a closed position; and
    circulation means for circulating unfiltered air through said case and said filter so that a flow of filtered air is exhausted from said case, the case including an inlet opening, coupled to the circulation means, and an outlet opening disposed along the path of the flow of air in the case on the opposite side of the filter from the inlet opening.

11. A portable clean-air generator as described in claim 10, wherein the first section of the case is hingedly attached to the second section of the case.

* * * * *